May 8, 1956  E. A. CIAVOLA  2,744,558
ANTI-SKID DEVICE

Filed Dec. 12, 1952  2 Sheets-Sheet 1

INVENTOR.
EUGENE A. CIAVOLA,
BY
McMorrow, Berman & Davidson
ATTORNEYS.

May 8, 1956  E. A. CIAVOLA  2,744,558
ANTI-SKID DEVICE
Filed Dec. 12, 1952  2 Sheets-Sheet 2
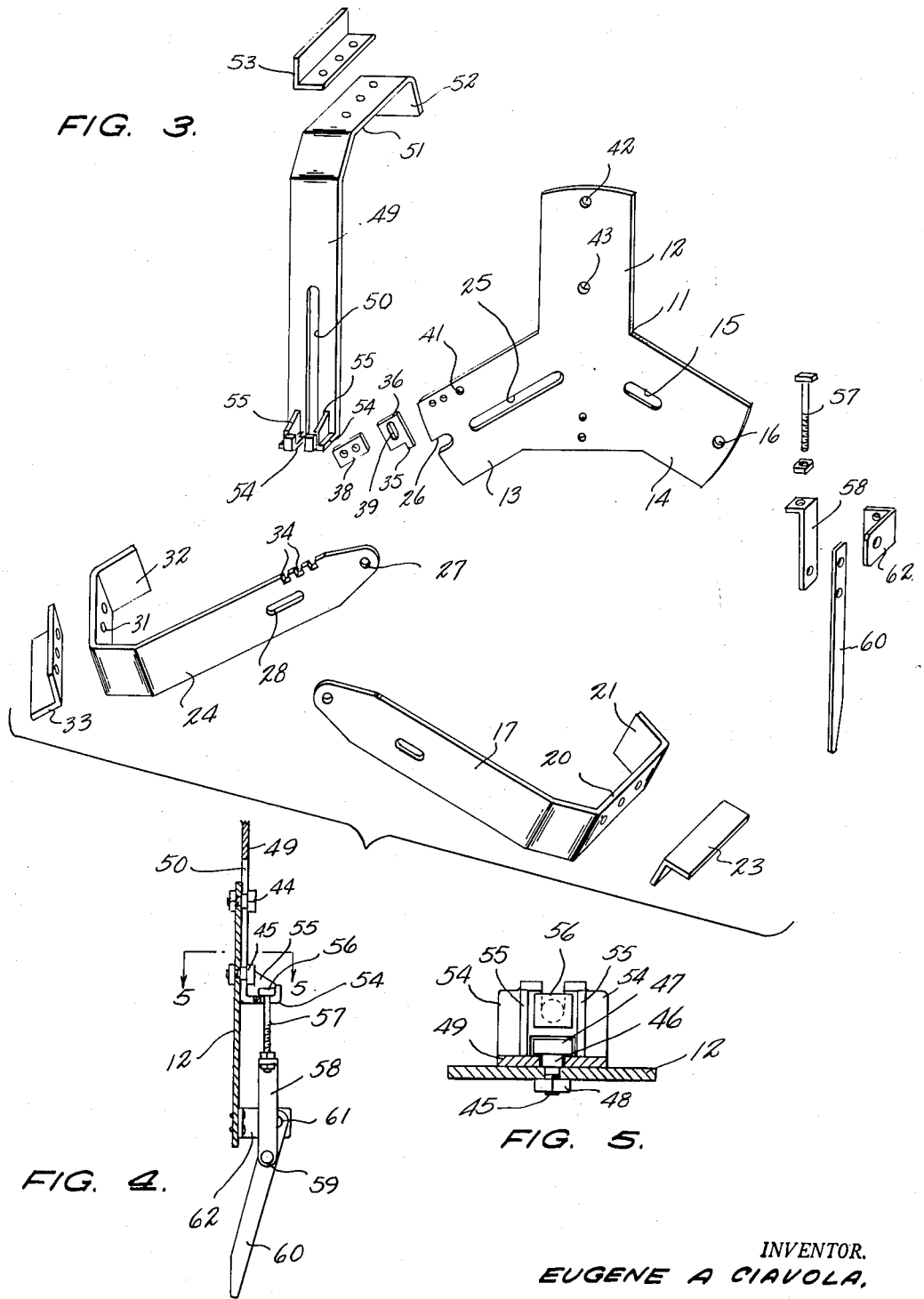
INVENTOR.
EUGENE A CIAVOLA,
BY
McMorrow, Berman + Davidson
ATTORNEYS.

United States Patent Office 2,744,558
Patented May 8, 1956

2,744,558

ANTI-SKID DEVICE

Eugene A. Ciavola, Clinton, Mass.

Application December 12, 1952, Serial No. 325,631

1 Claim. (Cl. 152—228)

This invention relates to anti-skid devices for automobile wheels, and more particularly to an improved emergency anti-skid device which may be mounted on an automobile wheel to provide increased traction for the wheel.

A main object of the invention is to provide a novel and improved emergency traction device for use on an automobile wheel to provide increased traction therefor, the improved device being simple in construction, being easy to apply to a wheel, and being readily adjustable so as to securely engage the wheel and and be held firmly thereon.

A further object of the invention is to provide an improved emergency anti-skid device which may be employed on a vehicle wheel to increase the traction of the wheel, so as to enable the vehicle to be moved from a deep rut, mud hole, or similar undesirable situation, the improved device being inexpensive to manufacture, being easy to manipulate, and being relatively compact in size, wherein it may be conveniently transported or stored in the vehicle for emergency use.

Further objects and advantages of the invention will become apparent from the following description and claim, and from the accompanying drawings, wherein:

Figure 3 is a perspective view showing the various major components of the traction device of Figures 1 and 2 in separated positions.

Figure 4 is a vertical cross sectional view taken on the line 4—4 of Figure 1.

Figure 5 is an enlarged horizontal cross sectional detail view taken on the line 5—5 of Figure 4.

Figure 1:
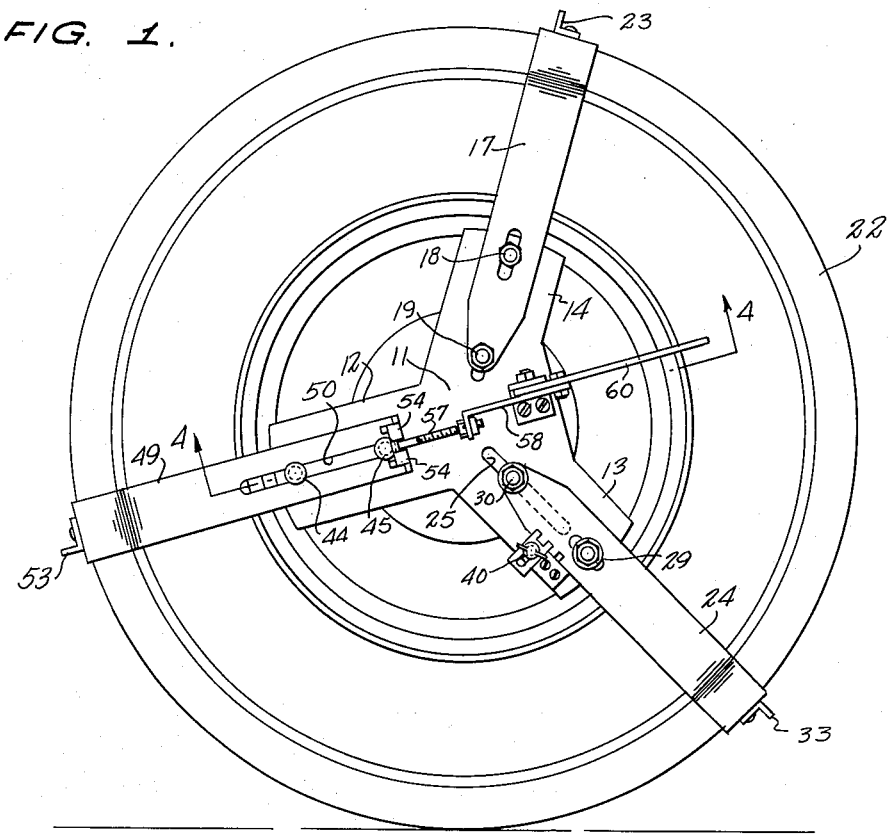
Figure 1 is a side elevational view showing an improved emergency traction device according to the present invention installed on an automobile wheel.

Referring to the drawings, the improved traction device comprises a substantially flat main body 11 of iron plate or the like, and formed with the respective, outwardly extending arms 12, 13 and 14 extending radially outwardly from the center of the main body 11 and spaced at substantial angles with respect to each other, such as for example at angles of 120° apart. The arm 14 is formed with the radially aligned slot 15 and aperture 16. Designated at 17 is a radially extending flat bar member which is secured to the arm 14 by respective bolts 18 and 19 extending through apertures on the bar member 17 and through the aperture 16 and slot 15 respectively. The outer end of the bar member 17 is formed with the transversely extending arm 20 and flange 21 adapted to be engaged transversely over the tread of a vehicle wheel 22, as shown in Figure 1. Secured to the arm 20 is the angle bar 23 which defines a traction element when arranged in the manner shown in Figure 1.

Designated at 24 is a second flat bar element adapted to be adjustably secured on the arm 13. Arm 13 is formed with the radially extending elongated slot 25 and with the notch 26 at its end radially aligned with the slot 25, as shown in Figure 3. Bar member 24 is formed at its end with an aperture 27 and with a slot 28 longitudinally aligned with the aperture 27, the bar member 24 being adapted to be secured to arm 13 by means of respective bolts 29 and 30, as shown in Figure 1. The bolt 29 extends through the notch 26 and then through the slot 28, whereas the bolt 30 extends through the slot 25 and then through the aperture 27. The bar member 24 is provided at its outer end with the transverse, tread-engaging arm 31 which is formed with the inwardly bent end flange 32, whereby the arm 31 may be engaged over the tread of the wheel 22. Secured to the arm 31 is the angle bar 33 defining a traction element, as in the case of the angle bar 23. The side edge of the bar 24 is formed with the spaced rectangular notches 34 which are lockingly engageable by the detent lug 35 on a locking plate 36 which is releasably secured to the side marginal portion of the arm 13. Secured to said side marginal portion in abutment with a side edge of the plate 36 is a rectangular block 38 which guides the locking plate 36 for movement at right angles to the side edge of bar member 24, the locking plate 36 being formed with a slot 39 through which is engaged a thumb screw 40 which extends through a threaded aperture 41 provided in the arm 13, said thumb screw being used for clamping the locking plate 36 in a fixed position on the arm 13. The bar member 24 may be adjusted to securely engage the tread of the wheel at the transverse arm 31 thereof, and when the bar member 24 has been adjusted radially to such a desired position, and the locking plate 36 is moved inwardly to engage the lug 35 in a notch 34, whereby the arm 24 is held in its desired position, the locking plate 36 may then be secured by tightening the thumb screw 40.

The bolt 29 and bolt 30 are both special shouldered bolts similar to bolts 44 and 45 on arm 12. See Figure 5 for details. After bolt 29 is properly located in slot 28 it is securely tightened. The shouldered portion of bolt 29 will engage in the notch 26. Since bolt 30 is also shouldered, bar member 24 may be freely swung from the position shown in Figure 2 to the position shown in Figure 1 without the necessity of loosening the nut on bolt 30. Of course, it will be understood that, in order to move bar member 24, it would first be necessary to disengage the locking plate 36 from the rectangular notches 34.

The arm 12 is formed with the radially aligned apertures 42 and 43 in which are secured the respective headed, shouldered bolts 44 and 45. As shown in Figure 5, the bolts are provided with the enlarged shouldered portions 46 as well as with the heads 47, whereby the bolts may be secured to the arm 12 in the positions illustrated in Figure 5, as by means of nuts 48 clampingly engaged with arm 12.

Designated at 49 is a flat bar member formed with the longitudinal slot 50 opening at one end thereof, the slot 50 being engageable with the shouldered shank portion 46 of the respective bolts 44 and 45. The outer end of the bar member 49 is formed with the transverse tread-engaging portion 51 having the inwardly bent end flange 52, as shown in Figure 3. Secured to the tread-engaging portion 51 is the angle bar 53 which defines a traction element on the wheel 22, similar to the angle bars 23 and 33.

The inner end of the bar member 49 is formed with the respective hooked flange elements 54, 54 which are rigidly braced by the respective triangular web elements 55, 55 welded in said hook elements, as shown in Figures 3 and 4 and defining a socket between the respective web elements 55, 55 in which the head 56 of a bolt member 57 may be engaged. The bolt member 57 is secured to the end of a link bar 58, said link bar being pivotally connected, at 59, to the intermediate portion of a lever 60, said lever being pivoted at 61 to an angle bracket 62 secured to the main body 11 of the device. As shown in Figure 4, when the lever 60 is rotated downwardly from an upstanding position to the depending position thereof shown in Figure 4, the bolt 57 exerts an inward pull on the bar member 49, whereby the tread-engaging element 51 of the bar member 49 is pulled tightly against the tread of the wheel, the lever 60 being locked in its depending position after it has been moved past its dead centered position.

Figure 2:
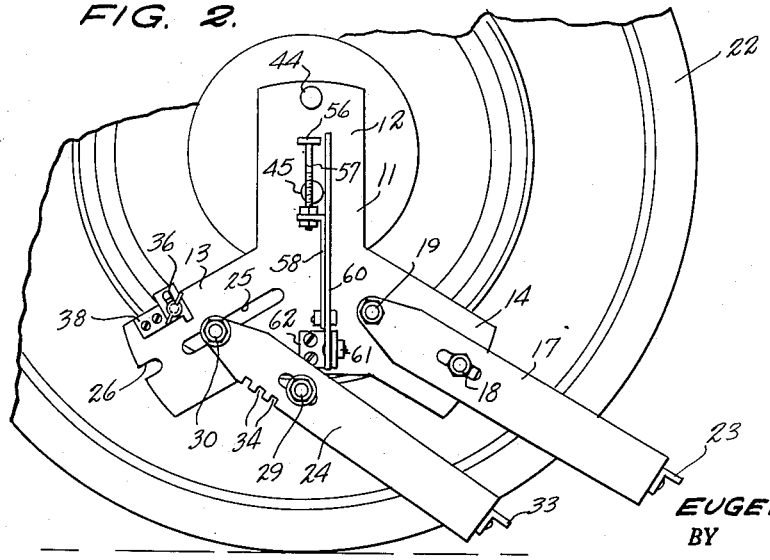
Figure 2 is a fragmentary side elevational view of the automobile wheel showing the traction device at the initial stage of its installation on the wheel.

To install the device on the wheel 22, the bar members 17 and 24 are first secured to the respective arms 14 and 13 in the manner shown in Figure 2 and the main body 11 is disposed against the hub portion of the wheel. The flat bar member 17 is then swung counter clockwise, as viewed in Figure 2, along with the attached main body 11, until flat bar member 17 is approximately perpendicular. The flat bar member 24 is then swung to a substantially radial position relative to the center of the main body 11 and the bar member 24 is then moved inwardly to bring its tread-engaging arm 31 against the tread of the wheel and to engage the shouldered portion of bolt 29 in the notch 26, the main body 11 being at the same time held in a substantially centered position relative to the wheel. The bar member 24 is adjusted inwardly and at this time the third bar member 49 may be engaged on the arm 12 by engaging the slot 50 of the bar member 49 with the bolts 44 and 45 in the manner above described, the head 56 of the bolt 57 being engaged in the socket defined between the web elements 55, 55 with the lever 60 in an outwardly extending position. The bar member 24 may then be locked to the arm 13 by means of the locking plate 36 in the manner above described. As a final step in the installation of the device, the lever 60 is rotated clockwise, as viewed in Figure 4, to its depending position, and beyond its dead centered depending position, as above described, to securely lock the device on the wheel 22.

The traction device may be removed from the wheel by following a procedure reverse with respect to that above described, the first step in the removal of the device being to rotate the lever 60 counterclockwise, as viewed in Figure 4, from its depending position to its upwardly extending position, which releases the clamping grip of the bar member 49 on the wheel. The locking plate 36 may then be disengaged from the bar member 24, allowing the bar member 24 to be extended outwardly, whereby the device may then be disengaged from the wheel 22.

While a specific embodiment of an emergency anti-skid device for a vehicle wheel has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an anti-skid device for a vehicle wheel, a plate having first, second, and third rigid radial arms, first, second, and third radial traction arms overlying said first, second, and third fixed arms, respectively, first means securing said first traction arm to said first plate arm for minor radial adjustment of the first traction arm relative to the first plate arm, second means securing said second traction arm to said second plate arm for greater radial adjustment of said second traction arm relative to said second plate arm, third means securing said third traction arm to said third plate arm for greatest radial adjustment of said third traction arm relative to said third plate arm, said third traction arm being freely slidable radially relative to said plate arm, and toggle lever means mounted on said plate across from said third traction arm at a point between said first and second plate arms and operatively connected to said third traction arm, and releasable detent means mounted on said second plate arm and engageable with said second traction arm for locking said second traction arm in adjusted position.

References Cited in the file of this patent
UNITED STATES PATENTS

| | | |
|---|---|---|
| 1,308,705 | Gajan | July 1, 1919 |
| 1,777,928 | Marsch | Oct. 7, 1930 |
| 1,882,376 | Weber | Oct. 11, 1932 |
| 2,169,950 | Hamalainen | Aug. 15, 1939 |
| 2,456,544 | Varner | Dec. 14, 1948 |
| 2,510,451 | Williams | June 6, 1950 |